No. 703,418. Patented July 1, 1902.
J. HOLLAND.
FOUNTAIN PEN.
(Application filed Mar. 17, 1902.)
(No Model.)
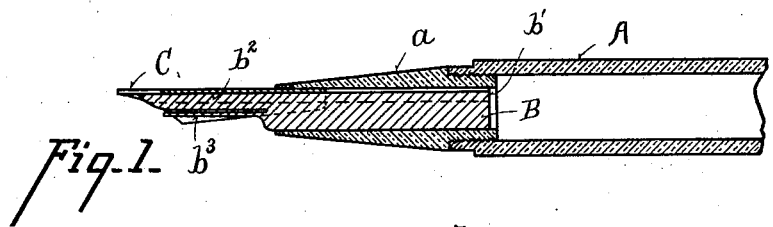
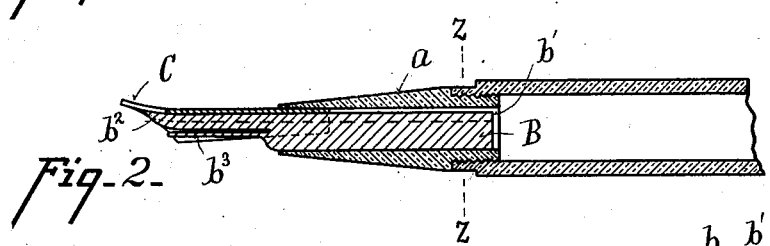
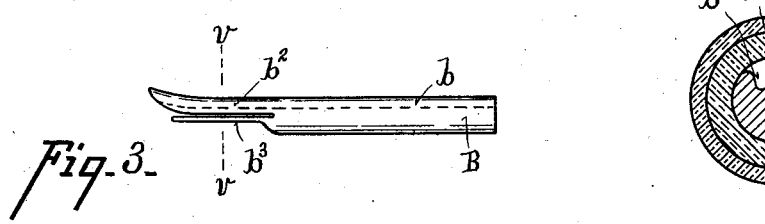
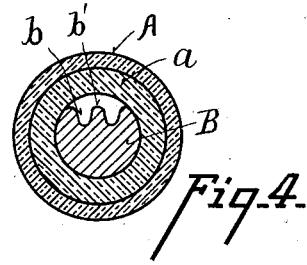
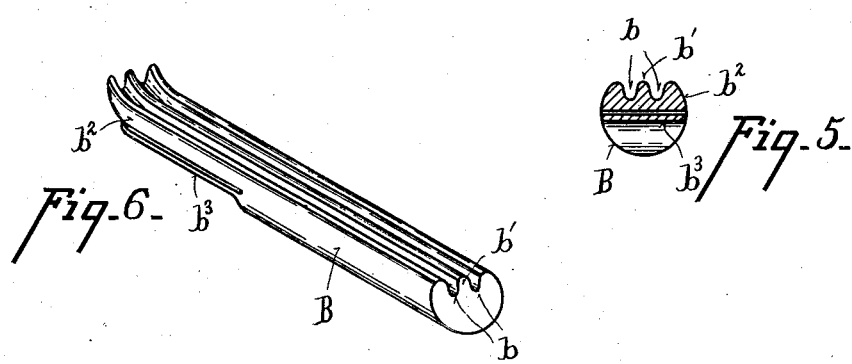
Witnesses
Albert W. Schwartz
Emma Lyford
Inventor
John Holland
By Murray & Murray
Attorneys

UNITED STATES PATENT OFFICE.

JOHN HOLLAND, OF CINCINNATI, OHIO.

FOUNTAIN-PEN.

SPECIFICATION forming part of Letters Patent No. 703,418, dated July 1, 1902.

Application filed March 17, 1902. Serial No. 98,521. (No model.)

*To all whom it may concern:*

Be it known that I, JOHN HOLLAND, a citizen of the United States of America, and a resident of Cincinnati, in the county of Hamilton and State of Ohio, have invented certain new and useful Improvements in Fountain-Pens, of which the following is a specification.

The object of my invention is a fountain-pen, in using which a constant and even flow of ink is obtained without danger of flooding, even when an unusual pressure is brought to bear on the nib.

Referring to the accompanying drawings, all the figures of which are made upon an enlarged scale, Figure 1 is a longitudinal central sectional view of a fountain-pen embodying my invention, showing the position of the feeder when the nib is in its normal shape, the end of the pen being broken off to economize space. Fig. 2 is a similar view showing the feeder in the shape it assumes when the nib is bent back. Fig. 3 is a detail side elevation of the feeder. Fig. 4 is a cross-section on line $z\,z$, Fig. 2. Fig. 5 is a cross-section on line $v\,v$, Fig. 3. Fig. 6 is a detail perspective view of the feeder.

Barrel A and nozzle $a$ in one end thereof are of ordinary construction.

Feeder B, which is made of hard rubber, has a channel $b$, divided by a longitudinal partition $b'$, which comes centrally beneath the pen C. Feeder B has a longitudinal horizontal slit extending backward from its forward end beneath channel $b$, dividing the front end of the feeder into a shallow upper part $b^2$, which is beneath the pen, and a lower part $b^3$. The part $b^2$, by reason of its small depth, is elastic and is given a permanent upward curve at its end, as shown in Figs. 3 and 6, so that before pen C is inserted in place end $b^2$ stands above the plane in which the pen is to lie and stands straight, as shown in Fig. 1, and bears upward against the under side of pen C when it is inserted in place between nozzle $a$ and feeder B, and that when the nibs are bent upward end $b^2$ follows them and remains in contact with them, as shown in Fig. 2. Thus in use no flooding occurs to blot the paper, as is the case where the feeder always remains straight, a space being then left between it and the nibs when the latter are bent backward by a strong pressure on them.

In use partition $b'$ assists, by reason of capillary action, in feeding the ink forward in sufficient quantities and prevents the formation of air-bubbles from obstructing the channel. The action of the feeder in preserving the proper space between it and the nibs at all times prevents the ink from being drawn down too freely at any stage, so that with my pen a steady and even flow of the writing fluid is maintained.

Part $b^3$ is left beneath part $b^2$, both to support it when the pen is being put in place and to give an appearance of strength to the feeder.

What I claim is—

1. In a fountain-pen a feeder having a channel beneath the pen and having its end elastic and curved upward to follow the pen when the nibs are bent, substantially as shown and described.

2. In a fountain-pen a feeder having a channel beneath the pen, a longitudinal slit beneath the channel forming an elastic end upon the feeder which is bent upward to contact the pen at all times, substantially as shown and described.

3. In a fountain-pen a feeder having a channel with a central partition beneath the pen and being curved upward at the end to contact the pen at all times, substantially as shown and described.

JOHN HOLLAND.

Witnesses:
W. F. MURRAY,
EMMA LYFORD.